United States Patent [19]

Judas et al.

[11] Patent Number: 5,138,021

[45] Date of Patent: Aug. 11, 1992

[54] THERMOTROPIC AROMATIC COPOLYESTERS COMPRISING RECURRING STRUCTURAL UNITS DERIVED FROM PARA-(PARA-HYDROXYPHENOXY)BENZOIC ACID OR DERIVATIVE THEREOF

[75] Inventors: Didier Judas, Paris; Patrick Douais, Le Noyer en Ouche, both of France

[73] Assignee: Atochem, Puteaux, France

[21] Appl. No.: 602,611

[22] Filed: Oct. 24, 1990

[30] Foreign Application Priority Data

Oct. 24, 1989 [FR] France .................. 89 13923

[51] Int. Cl.⁵ ............... C08G 63/00; C08G 67/00; C08G 69/00
[52] U.S. Cl. ..................... 528/190; 528/86; 528/176; 528/193; 528/271
[58] Field of Search ............ 528/176, 190, 193, 86, 528/271

[56] References Cited

U.S. PATENT DOCUMENTS

| | | | |
|---|---|---|---|
| 4,067,852 | 1/1978 | Calundann | 528/190 |
| 4,161,470 | 7/1979 | Calundann | 528/190 |
| 4,265,802 | 5/1981 | Choe | 528/173 |
| 4,868,271 | 9/1989 | Dahl et al. | 528/171 |

FOREIGN PATENT DOCUMENTS 2058102  4/1981  United Kingdom .

OTHER PUBLICATIONS

Patent Abstracts of Japan, vol. 5, No. 4 (C-38) [676], Jan. 13, 1981.
Patent Abstracts of Japan, vol. 12, No. 344 (C-528) [3191], Sep. 16, 1988.

*Primary Examiner*—Harold D. Anderson
*Assistant Examiner*—Terressa Mosley
*Attorney, Agent, or Firm*—Burns, Doane, Swecker & Mathis

[57] ABSTRACT

Novel thermotropic aromatic copolyesters comprise the following recurring structural units:

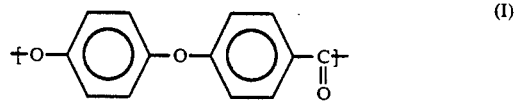

(I)

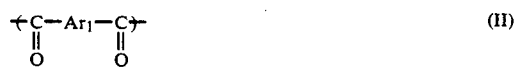

(II)

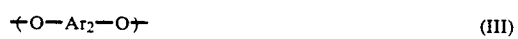

(III)

and, optionally,

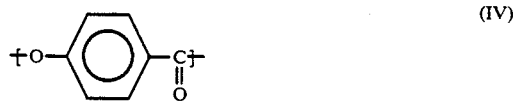

(IV)

and are prepared by polycondensing p-(p-hydroxyphenoxy)-benzoic acid with an aromatic or cycloaliphatic diacid, a diphenol and, optionally, p-hydroxybenzoic acid.

12 Claims, 1 Drawing Sheet

FIGURE OF DRAWING

THERMOTROPIC AROMATIC COPOLYESTERS COMPRISING RECURRING STRUCTURAL UNITS DERIVED FROM PARA-(PARA-HYDROXYPHENOXY)BENZOIC ACID OR DERIVATIVE THEREOF

BACKGROUND OF THE INVENTION

1. Field of the Invention

The present invention relates to novel thermotropic aromatic copolyesters comprising recurring structural units derived from para-(para-hydroxyphenoxy)benzoic acid or derivative thereof, an aromatic or cycloaliphatic diacid or derivative thereof, a diphenol or derivative thereof and optionally substituted para-hydroxybenzoic acid or derivative thereof.

The (aromatic or aliphatic) rings of the above monomers can either be substituted or unsubstituted.

The novel copolyesters of this invention possess the property of being thermotropic, namely, they can be converted into anisotropic melts that are easy to shape by spinning or molding.

2. Description of the Prior Art

As indicated in EP-A-0,010,051, the anisotropy of polyesters may be demonstrated by the TOT thermo-optical method described in FR-A-2,270,282. When the copolymer is observed in the molten state in optical systems equipped with crossed polarizers, a transmission of the polarized light and creation of a strong birefringence occur, whereas transmission of the light and the birefringence are zero for isotropic products. As a result, the molten masses possess a particular orientation and a relatively high degree of organization, as do the shaped articles formed therefrom, such as threads, films and molded articles, thus providing them, even in the crude state, with improved properties, such as modulus and toughness, which are not usually possessed by isotropic crude products In particular, these molded articles possess advantageous properties in one direction, comparable to those of glass fiber-reinforced plastics.

Typically, the thermotropic copolymers, while possessing excellent mechanical properties, have, on the other hand, high melting points, in general on the order of 270° to 400° C. These high temperatures necessitate appropriate processing equipment, and require an energy consumption higher than that necessary for the processing of conventional resins. In addition, when the melting points are high, the production of molded shaped articles possessing excellent mechanical properties proves difficult or even impossible.

Aromatic copolyesters, thermotropic or otherwise, have long been known to this art:

U.S. Pat. No. 4,067,852 (Celanese), for example, describes wholly aromatic thermotropic copolyesters which can be melt-processed, comprising recurring structural units derived from p-hydroxybenzoic acid, 2,6-naphthalenedicarboxylic acid and hydroquinone.

U.S. Pat. No. 4,161,470 (Celanese) describes thermotropic aromatic copolyesters prepared from 6-hydroxy-2-naphthoic acid and p-hydroxybenzoic acid.

Aromatic copolyesters comprising recurring structural units derived from p-(p-hydroxyphenoxy)benzoic acid or derivative thereof are also known to this art.

Patent Application J 80-133,423 (Hitachi) describes the preparation of copolyesters from (p-(or o- or m-)acetoxyphenoxy)benzoic acid, terephthalic acid and bisphenol diacetate. These copolyesters are not thermotropic and they are, in addition, soluble in chloroform, chlorobenzene and N-methylpyrrolidone, solvents in which the thermotropic copolyesters are generally insoluble.

Patent Application EP 275,164 (ICI) describes copolyesters prepared from p-hydroxybenzoic acid, hydroquinone, isophthalic acid and p-(p-hydroxyphenoxy)benzoic acid, in which the contents of monomers derived from p-(p-hydroxyphenoxy)benzoic acid is not more than 2.5 mol % of the total amount of monomers Patent Application J 63-101,416 (Asahi) describes thermotropic copolyesters principally derived from p-hydroxybenzoic acid and p-(p-hydroxyphenyl)benzoic acid or p-(p-hydroxyphenoxy)benzoic acid and, optionally, up to 5 mol % of iso- or terephthalic acid and resorcinol relative to the total amount of monomers.

Irrespective of the mole ratio between the units derived from p-hydroxybenzoic acid and those derived from p-(p-hydroxyphenoxy)benzoic acid, since their melting point is above 345° C., their processing into molded shaped articles thus necessitates a temperature above 370° C., which makes them particularly difficult to use. Furthermore, their mechanical properties are not very good.

SUMMARY OF THE INVENTION

A major object of the present invention is the provision of novel aromatic thermotropic copolyesters comprising the following recurring structural units:

(I)

(II)

(III)

and, optionally,

(IV)

in which recurring units $Ar_1$ is an aromatic and/or cycloaliphatic radical and $Ar_2$ is an aromatic radical, each such aromatic or aliphatic radical of the recurring units (I) to (IV) being either substituted or unsubstituted, and with the proviso that the amount of the recurring units (I) relative to the sum of all of the recurring units ranges from 2.5% to 60 mol %; the amount of the recurring units (II) relative to the sum of all of the recurring units ranges from 2.5% to 45 mol %, the amount of the recurring units (III) relative to the sum of all of the recurring units ranges from 2.5% to 45 mol %; the amount of the recurring units (IV) relative to the sum of all of the recurring units ranges from 0% to 90 mol %; and the mole ratio of the recurring units (II) to the recurring units (III) ranges from 0.95 to 1.05.

DETAILED DESCRIPTION OF THE PREFERRED EMBODIMENTS OF THE INVENTION

More particularly according to the present invention, in the recurring units (II) and (III), the divalent radicals $Ar_1$ and $Ar_2$ each represent a radical containing one or more aromatic rings, more simply Ar, which can be fused or joined to one another either via a covalent bond, or via a bridging oxygen or sulfur atom, or, alternatively, via a saturated or unsaturated, linear or branched chain aliphatic divalent radical which can contain one or more oxygen and/or sulfur atoms along the chain.

Exemplary of such radicals Ar are those of the following formulae:

and/or

In the first such formula, r is equal to 0, 1 or 2 and X is a divalent radical of the formula:

$$[Y]_m[R]_p[Z]_q$$

in which Y and Z are independently oxygen or sulfur atoms and R is a saturated or unsaturated, linear or branched chain aliphatic radical having up to 24 carbon atoms.

In this formula, m, p and q can be independently equal to 0 or 1.

The other two formulae represent the different options of disubstitution of a naphthalene group, either on each of the two rings, or on a single ring.

In the thermotropic copolyesters according to the present invention, Ar satisfies one or the other of the following conditions:

The bonds which link Ar to the groups are:
(1) either parallel and/or substantially parallel; in this event, the corresponding recurring units are considered to be linear; or
(2) oriented in non-parallel directions; in this event, the corresponding recurring units are considered to be non-linear.

By "parallel" bonds are intended, in particular, bonds which are arranged:
(i) either in the 1,4-position of a phenylene radical or of a naphthylene radical,
(ii) or in the para, para'-position of a biphenylene radical,
(iii) or in the para, para"-position of a terphenylene radical, and which correspond to the following formulae:

and

By "substantially parallel" bonds are intended the other bond arrangements in (roughly) parallel directions, and in particular bonds arranged diagonally on fused rings, such as, for the 2,6-naphthylene radical or the 3,4'-diphenyl ether radical:

As indicated above, recurring units of this type are considered to be linear, which is hence the case with the recurring units (IV).

The following formulae are exemplary of the linear structures which can be symbolized by —Ar—:

wherein n=1, 2, 3.

The following formulae are exemplary of the non-linear structures which can be symbolized by Ar:

The divalent radical $Ar_1$ can also be a cycloaliphatic radical; in this event, the corresponding recurring unit (II) is considered to be non-linear.

In a preferred embodiment of the invention, the content of non-linear recurring units in the subject copolyesters is not more than 60 mol %.

The rings and ring-systems of the recurring units (I) to (IV) described above may be substituted by monovalent radicals, and in particular by:

(i) linear or branched chain alkyl or alkoxy radicals, of the formulae $-C_nH_{2n+1}$ and $-OC_nH_{2n+1}$, respectively, with n generally ranging from 1 and 24;

(ii) aromatic radicals generally having from 6 to 24 carbon atoms; or (iii) particular atoms, especially halogens such as chlorine, bromine, etc., with the proviso that said alkyl, alkoxy and/or aromatic radicals may themselves be substituted by different monovalent radicals as described above.

The recurring units (I) are advantageously derived from para-(para-hydroxyphenoxy)benzoic acid and/or from one or more of the derivatives thereof, such as its esters, in particular the acetates, for example para-(para-acetoxyphenoxy)benzoic acid; the recurring units (I) are considered to be non-linear.

The recurring units (II) are advantageously derived from aromatic and/or cycloaliphatic dicarboxylic acids and/or from the derivatives thereof, such as their diesters. They may be used either alone or in admixture. Preferred aromatic diacids are terephthalic acid, isophthalic acid, 4,4'- and 3,4'-dicarboxydiphenyl ethers, 4,4'- and 3,4'-dicarboxydiphenyl sulfides, 4,4'- and 3,3'-dicarboxybiphenyls, 4,4'-dicarboxy-para-terphenyl, 2,6-dicarboxynaphthalene, 2,7-dicarboxynaphthalene, 1,5-, 1,4- and 1,3-dicarboxynaphthalenes, 4,4'-dicarboxy-1,2-diphenoxyethane, 4,4'-dicarboxy-1,4-diphenoxybutane, 4,4'-dicarboxy-1,6-diphenoxyhexane and 4,4'-dicarboxy-(trans)-stilbene.

Among the preferred cycloaliphatic diacids is 1,4-dicarboxycyclohexane in cis and/or trans form.

The recurring units (III) are advantageously derived from a diphenol and/or from a derivative thereof, such as the diesters. They may be used either alone or in admixture. Preferred diphenols are hydroquinone, chlorohydroquinone, bromohydroquinone, methylhydroquinone, ethylhydroquinone, phenylhydroquinone, resorcinol, 4,4'- and 3,3'-dihydroxybiphenyls, 4,4'- and 3,4'-dihydroxydiphenyl ethers, 4,4,- and 3,4'-dihydroxydiphenyl sulfides, 4,4'-dihydroxy(trans)-stilbene, 2,6-dihydroxynaphthalene, 1,5-, 1,4- and 1,3-dihydroxynaphthalenes and 2,7-dihydroxynaphthalene.

The recurring units (IV) are advantageously derived from para-hydroxybenzoic acid and/or from one or more of the derivatives thereof.

Exemplary of (substituted) derivatives of p-hydroxybenzoic acid according to the invention are 4-hydroxy-3-methoxybenzoic acid, 4-hydroxy-2-methylbenzoic acid, 4-hydroxy-3-methylbenzoic acid, 3-ethyl-4-hydroxybenzoic acid, 2-ethyl-4-hydroxybenzoic acid, 4-hydroxy-3-phenylbenzoic acid and 4-hydroxy-2-phenylbenzoic acid.

The number average molecular weight of the copolyesters according to the invention preferably ranges from 3,000 to 50,000, and more preferably from 5,000 to 40,000.

The present invention also features a process for the preparation of the copolyesters described above.

The thermotropic copolyesters according to the invention may, in particular, be prepared by the polycondensation of a mixture of monomers, namely:
(i) p-(p-hydroxyphenoxy)benzoic acid or derivative thereof;
(ii) at least one aromatic or aliphatic, more simply "aromatic", diacid or derivative thereof;
(iii) at least one diphenol or derivative thereof; and
(iv) p-hydroxybenzoic acid or derivative thereof, with the proviso that the aromatic or aliphatic rings of the above monomers (and/or their derivatives), as well as those noted in the following description, may optionally be substituted with the radicals described above.

The polycondensation reaction is typically carried out under an inert atmosphere at a temperature ranging from 100° to 450° C., and preferably from 150° to 400° C., with stirring.

During the polycondensation, the pressure in the reaction medium can be reduced at any time down to approximately 5 Pa. The by-products formed, such as an acid, a phenol or water, or alternatively unreacted reactants, may be removed from the reaction medium throughout the polycondensation period, under an inert atmosphere and/or under reduced pressure.

The copolyesters according to the invention may, more specifically, be prepared according to different polycondensation processes, in particular:
(a) By direct polycondensation between:
(i) p-(p-hydroxyphenoxy)benzoic acid,
(ii) at least one aromatic diacid of the formula:

(HOOC—Ar$_1$—COOH), (iii) at least one diphenol of the formula:

(HO—Ar$_2$—OH), and
(iv) p-hydroxybenzoic acid and/or at least one derivative thereof.

The different comonomers may be introduced into the reaction medium in any order, separately or together. While they may be introduced as a mixture, they may also be introduced sequentially, partially or entirely, during the reaction. The reaction may be schematically represented by the following equation:

~COOH+HO~→~COO~+H$_2$O.

The copolyesters thereby produced generally possess carboxyl and/or phenol terminal groups (~COOH and/or ~OH).

(b) By polytransesterification between:
(i) at least one ester of p-(p-hydroxyphenoxy)benzoic acid of the formula:

(ii) at least one aromatic diester (ArOOC—Ar$_1$—COOAr),
(iii) at least one diphenol (HO—Ar$_2$—OH),
(iv) at least one ester of p-hydroxybenzoic acid and/or at least ester of (substituted) derivative thereof of the formula:

The reaction may be schematically represented by the following equation:

~COOAr+HO~→~COO~+ArOH.

In this process, it is preferred to react the phenol groups of the different monomers with aromatic esters; the latter may be prepared according to any esterification reaction between:
(i) a carboxyl group and a phenol ~COOH+HO—Ar→~COOAr+H$_2$O (ii) the acid chloride of a carboxyl group and a phenol ~COCl+HO—Ar→~COOAr+HCl (iii) a carboxyl group and a diaryl carbonate If it is selected to prepare the aromatic esters according to the first two reactions described above, it is preferable to synthesize them in a first step, prior to carrying out any polycondensation reaction. In contrast, in the event that it is elected to use the diaryl carbonate to prepare these aromatic ester functions, it is possible:
(1) either to prepare, in a first step, the aromatic esters by reacting the monomers bearing carboxyl functions with the diaryl carbonate in the absence of the diphenol(s), and then to introduce the latter in a second step (in any order, separately or together, entirely or partially during the actual polycondensation reaction); or
(2) to introduce the different comonomers into the reaction medium, in any order, separately or together, in the presence of the diaryl carbonate used to esterify the carboxyl functions. In this event, the two reactions (esterification of the carboxyl functions and polycondensation) take place successively, but without a true differentiation in time.

Exemplary of such diaryl carbonates, diphenyl carbonate is the preferred. In this case, the product formed during the polytransesterification reaction is phenol.

The copolyesters obtained typically possess phenol and/or aromatic ester terminal groups (~OH and/or ~COOAr).

They can be prepared by a so-called acidolysis polytransesterification reaction between:

(i) an ester of p-(p-hydroxyphenoxy)benzoic acid in respect of the phenol function and/or at least one ester of (substituted) derivative thereof, also in respect of the phenol function

(ii) at least one aromatic diacid

(iii) at least one diphenol diester (iv) an ester of p-hydroxybenzoic acid in respect of the phenol function

The reaction may be represented by the following equation:

In the preferred process, the carboxyl groups of the different monomers are reacted with alkanoic acid esters in respect of the phenol function.

These esters may be prepared according to any esterification reaction between:

(i) a phenol group and the alkanoic acid (ii) a phenol group or salt thereof and the alkanoic acid chloride with R′=H, Na, K, etc.

(iii) a phenol group and an aliphatic acid anhydride

If it is elected to prepare these esters according to the first two reactions described above, it is preferable to synthesize them in a first step prior to any polycondensation reaction. In contrast, in the event that it is elected to use an anhydride to modify the phenol functions, it will be possible:

(1) either to prepare, in a first step, these esters by reacting the monomers bearing phenol functions with the anhydride in the absence of the aromatic diacid(s), and then to introduce the latter in a second step, in any order, separately or together, entirely or partially, during the actual polycondensation reaction, or (2) to introduce the different comonomers into the reaction medium, in any order, separately or together, in the presence of the aliphatic acid anhydride used to esterify the phenol functions. In this case, the two reactions (esterification of the phenol functions and polycondensation take place successively, but without a true differentiation in time.

Exemplary of the alkanoic acids or chlorides thereof which are suitable, it is preferable to use acids or chlorides having from 2 to 6 carbon atoms, and advantageously acetic acid. As regards the anhydrides, it is preferable to use anhydrides derived from alkanoic acids having from 2 to 6 carbon atoms, and advantageously acetic anhydride. In this event, the product formed during the acidolysis reaction is acetic acid.

The copolyesters thereby obtained generally possess carboxyl terminal groups and/or terminal groups comprising esters of phenol functions (~COOH and/or ~OCOR with $R=C_nH_{2n+1}$ with $n=1$ to 5).

Irrespective of the polycondensation process, catalysts may be used and incorporated into the reaction medium at any stage of the reaction. Their amount is generally on the order of 0.001% to 2% by weight, based on the total weight of the initial charge of monomers, and more specifically on the order of 0.01% to 0.5% by weight. Several catalysts may be used at the same time. Exemplary catalysts to accelerate polycondensation or transesterification reactions are Lewis acids, oxides, hydrides, hydroxides, alcoholates, phenolates, salts of inorganic or organic acids and complex or mixed salts of alkali metals or alkaline earth metals. Advantageously, sodium acetate, potassium acetate, calcium acetate, magnesium acetate, zinc acetate, cobalt acetate, antimony trioxide, calcium benzoate, titanium tetrabutylate and zirconium tetrabutylate are used, and preferably magnesium acetate, manganese acetate, sodium acetate, potassium acetate and zinc acetate.

Other than the monomers used for providing the required recurring structural units in the final copolyester, it is also possible to incorporate monofunctional compounds, the function of which is to limit the molecular weight of the final polymer. From a practical standpoint, in order to impart an optimal level of thermomechanical properties in the final copolyester, the amount of such compounds relative to the total of the other monomers does not generally exceed 2 mol %, and preferably 1 mol %, in order to produce relatively high molecular weights. Exemplary of such compounds are β-naphthol, para-nonylphenol, 4-hydroxybiphenyl and 2-carboxynaphthalene or isomer thereof. Depending on the polycondensation process selected, these compounds may be modified to aromatic esters (~COOAr) or to phenol esters (~O-COR) according to the nature of the functional group borne by the compound. From a practical standpoint, these compounds may be incorporated in the reaction medium with all monomers or, without discrimination, at any stage of the reaction. The presence of these compounds has the effect of modifying the nature of certain chain ends.

In general, the copolyesters according to the invention are preferably prepared by the acidolysis process described above. The reaction is typically carried out at 100° C. to 400° C., under an inert atmosphere and with stirring, especially when the monomers are used in the acid and phenol form (in situ esterification of the phenol functions), or at a temperature ranging from 230° to 400° C. when the monomers containing phenol functions are used directly in the form of alkanoic acid esters.

The reaction is generally initiated at low temperature, which is gradually increased during the reaction. The reaction is carried out under an inert atmosphere until a degree of conversion on the order of 80% is attained. When distillation of the acid formed during the condensation, in general acetic acid, diminishes, the polycondensation is continued under a greater or lesser vacuum which can range up to 5 Pa. The attainment of this vacuum is generally conducted in successive stages. During the final phase of the reaction, the tendency is to reduce the speed of stirring depending upon the increase in viscosity of the reaction medium.

In order to further illustrate the present invention and the advantages thereof, the following specific examples are given, it being understood that same are intended only as illustrative and in nowise limitative.

In said examples to follow, the melting point of each polycondensate was determined by differential thermal analysis.

The anisotropy range was determined by examination of a sample of each polycondensate using a microscope equipped with a THM 600 heating stage linked to a LINKAM TMS 90 temperature programmer, between glass slides, for a rate of temperature increase on the order of 5° to 20° C. per minute.

The tensile stress and modulus are expressed in MPa, and the elongation at break in %, according to ISO Standard R 527.

The bending stress and flexural modulus are expressed in MPa according to ISO Standard 178.

Viscoelastic analysis of the copolyesters was carried out using a RHEOMETRIX 800 apparatus. The modulus of elasticity G' in torsion was determined at a frequency of 10 Hz between −140° and 250° C. with a rate of heating of 5° C. per min.

Also in the examples which follow, a, b, c and d represent the amounts of the recurring structural units I, II, III and IV, respectively, relative to the sum of all of the recurring units; a, b, c and d are expressed in mol % in the examples and per mole in the tables.

COMPARATIVE EXAMPLE 1

The following reactants were introduced into a stirred 250-cm³ glass polycondensation reactor provided with a device enabling the reaction medium to be swept with an inert gas, and equipped with a distillation column surmounted by a condenser and a graduated cylinder for recovery of the effluents formed during the reaction:

(a) para-(para-acetoxyphenoxy)benzoic acid (PPAB): 54.45 g (0.2 mole);

(d) para-acetoxybenzoic acid (PAB: 36.03 g (0.2 mole).

Under these conditions, the ratio d/a was equal to 1.

The reactor was purged with nitrogen and then immersed, while swept with nitrogen, in a molten metal bath set at 240° C. After a few minutes, the first drop of acetic acid distilled over (to of the reaction). After 15 minutes at this temperature, the amount of effluents collected, 9 cm³, corresponded to 39.3% of the theoretical amount of acetic acid. The temperature of the molten metal bath was thereafter gradually increased over the course of 10 minutes to 280° C., at which temperature the reaction was continued for 15 minutes. At the end of this temperature plateau, 78.6% by weight of the theoretical acetic acid had been recovered. The temperature of the molten metal bath was then adjusted to 300° C. over 10 minutes and the reaction was continued for 30 min at this temperature.

At the end of this second temperature plateau, 83.3% by weight of the theoretical amount of acetic acid, equivalent to 20 g, had been recovered.

The pressure in the reactor was then gradually decreased from $1,008 \times 10^2$ Pa to 27 Pa and, over the same time period, the temperature of the molten metal bath was adjusted to 400° C. over the course of 35 min.

After 120 minutes of reaction (85 under an inert atmosphere and then 35 under reduced pressure), 22.5 cm³ of acetic acid, equivalent to 98.2% of theory, had been recovered in total.

The polymer obtained was fibrous and light brown. Its melting point was 352° C. This polymer was anisotropic from melting up to a temperature of more than 380° C.

After being granulated, dried under vacuum at 80° C. for 6 hours and molded on a Mining MCP 25 SA press at a temperature of 375° C. for a mold temperature of 150° C. in the form of standardized test pieces, the tensile and flexural tests carried out on this polymer gave the following values:

Tensile stress: 18 MPa
Elongation at break: 0.6%
Bending stress: 64 MPa
Flexural modulus: 3,375 MPa.

This copolyester comprised the following recurring units:

with a=50% and d=50%.

COMPARATIVE EXAMPLES 2 TO 5

These examples relate to the preparation of aromatic copolyesters prepared from:

(a) para-(para-acetoxyphenoxy)benzoic acid (PPAB);

(b) terephthalic acid (T);

(c) hydroquinone diacetate (HQdiAc);

(d) para-acetoxybenzoic acid (PAB), with (b+c) equal at most to 5 mol % of the mixture a+b+c+d.

These copolyesters were prepared in a stirred 80-cm³ polycondensation reactor provided with a device enabling the reaction medium to be swept with an inert gas, and equipped with a distillation column surmounted by a condenser and a graduated cylinder for recovery of the effluents formed during the reaction.

The conditions of synthesis were identical to those of Example 1. They are reported in Table 1.

Table 2 reports the principal properties of these copolyesters, the structures of which are shown in Table 3.

N.B. Comparative Examples 1 to 5 relate to copolyesters described in Patent Application J 63-101,416 (ASAHI CHEMICAL).

EXAMPLES 6 TO 10

These examples illustrate the synthesis and properties of wholly aromatic copolyesters prepared from:
(a) para-(para-acetoxyphenoxy)benzoic acid (PPAB);
(b) terephthalic acid (T);
(c) hydroquinone diacetate (HQdiAc);
(d) para-acetoxybenzoic acid (PAB), with b+c greater than 5 mol % of the mixture a+b+c+d.

The conditions of synthesis were identical to those of Example 1. They are reported in Table 4.

The copolyester whose synthesis is described in Example 6 was prepared in a polycondensation apparatus identical to that used for preparing the copolyester of Example 1.

The copolyesters whose syntheses are described in Examples 7 to 10 were prepared in a polycondensation apparatus identical to that used for preparing the copolyester of Example 2.

The copolyester obtained according to Example 6 was fibrous and whitish. Its melting point was 302° C. This polymer was anisotropic from melting up to a temperature of more than 370° C. After being granulated, dried under vacuum at 80° C. and molded on a MINING MCP 25 SA press at a temperature of 315° C. for a mold temperature of 90° C. in the form of standardized test pieces, the tensile and flexural tests carried out on this polymer gave the following values:

Tensile stress: 81 MPa
Elongation at break: 2.3%
Bending stress: 114 MPa
Flexural modulus: 5,345 MPa.

Moreover, the principal properties of the copolyesters described in Examples 7 to 10 are reported in Table 5.

The products described in Examples 6 to 10 correspond to the formulae shown in Table 6.

EXAMPLES 11 TO 15

These examples illustrate the synthesis and properties of wholly aromatic copolyesters prepared from:
(a) para-(para-acetoxyphenoxy)benzoic acid (PPAB);
(b) terephthalic acid (T), isophthalic acid (I), 4,4'-dicarboxydiphenyl ether (4,4' DCDPE);
(c) hydroquinone diacetate (HQdiAc), methylhydroquinone diacetate (MeHQdiAc), 4,4'-dihydroxybiphenyl diacetate, (4,4'-DHBPdiAc);
(d) para-acetoxy-meta-methoxybenzoic acid (PAMB), para-acetoxybenzoic acid (PAB).

The conditions of synthesis were identical to those of Example 1. They are reported in Table 7. These copolymers were prepared in a polycondensation apparatus identical to that used for preparing the copolyester of Example 2.

The principal properties of the products obtained are reported in Table 8. Their formulae are shown in Table 9.

Changes in the modulus of elasticity G' with temperature

In order to evaluate this property, the copolyesters obtained according to Examples 1, 5 and 6 were finely ground, dried under vacuum at 80° C. for 6 hours and compression-molded.
(i) Size of the test pieces: 55×12.7×2 mm
(ii) Pressure and holding time: 2 tonnes for 10 minutes
(iii) Mold temperature:
   Copolyester of Example 1: 310° C.
   Copolyester of Example 5: 290° C.
   Copolyester of Example 6: 290° C.

Figure 1:
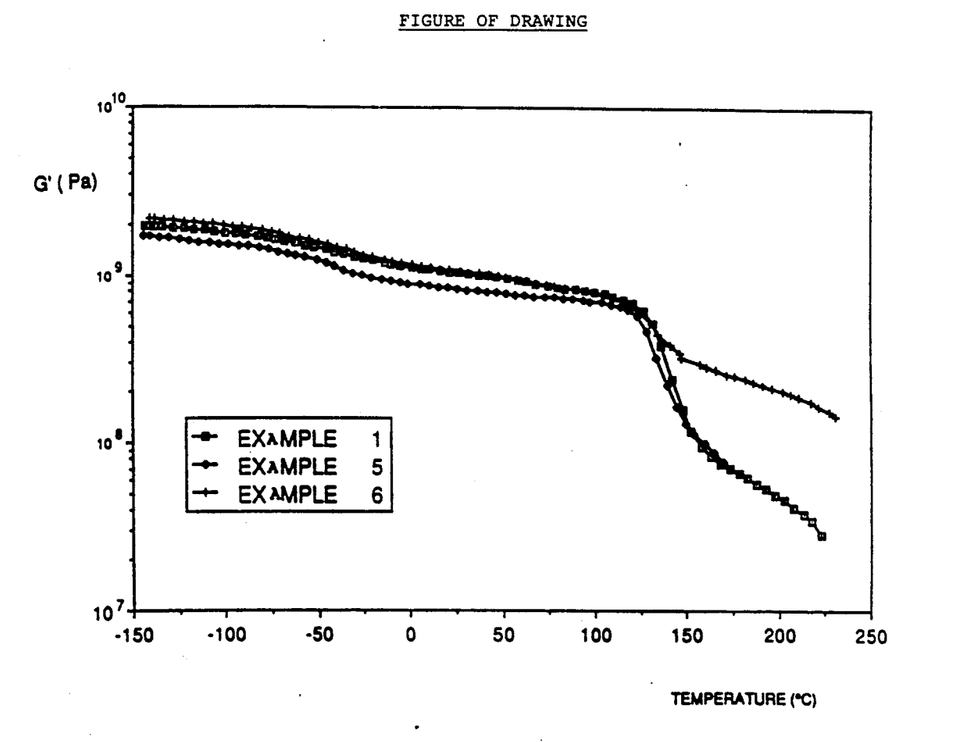

After cooling and release of the specimens from the mold, viscoelastic analysis of these copolyesters as a function of temperature gave the results reported in Table 10 (partial values). FIG. 1 indicated more precisely the changes in the modulus G' with temperature (graph taking account of all values).

It was observed that the polyester of Example 6 according to the invention exhibited better preservation of the modulus with increasing temperature.

EXAMPLES 16 TO 20

These examples illustrate the synthesis and properties of wholly aromatic copolyesters prepared from:
(a) para-(para-acetoxyphenoxy)benzoic acid (PPAB);
(b) terephthalic acid (T), isophthalic acid (I);
(c) hydroquinone diacetate (HQdiAc), methylhydroquinone diacetate (MeHQdiAc), 4,4'-dihydroxybiphenyl diacetate (4,4'-DHBPdiAc);
(d) para-acetoxybenzoic acid (PAB).

The conditions of synthesis were identical to those of Example 1. They are reported in Table 11. The copolymers were prepared in a polycondensation apparatus identical to that used for preparing the copolyester of Example 2.

The principal properties of the products obtained are reported in Table 12. Their formulae are shown in Table 13.

TABLE 1

AMOUNT OF MONOMERS INTRODUCED INTO THE REACTOR

| EXAMPLE NUMBER | a PPAB g | mole | b T g | mole | c HQdiAc g | mole | d PAB g | mole | REACTION TIME (MIN) UNDER STREAM OF NITROGEN | UNDER REDUCED PRESSURE |
|---|---|---|---|---|---|---|---|---|---|---|
| 2 | 10.89 | 0.04 | / | / | / | / | 10.81 | 0.06 | 50 | 30 |
| 3 | 8.44 | 0.031 | / | / | / | / | 12.43 | 0.069 | 52 | 58 |
| 4 | 16.34 | 0.06 | / | / | / | / | 7.21 | 0.04 | 60 | 55 |
| 5 | 13.07 | 0.048 | 3.33 | 0.002 | 3.89 | 0.002 | 8.65 | 0.048 | 80 | 50 |

| EXAMPLE NUMBER | REACTION TEMPERATURE (temperature profile) | DEGREE OF CONVERSION (%) At the end of the step under nitrogen | Final value for the reaction |
|---|---|---|---|
| 2 | 25 min at 250° C. 30 min from 250° to 330° C. 25 min at 330° C. | 80.1 | 98.3 |

TABLE 1-continued

| | | | |
|---|---|---|---|
| 3 | 20 min at 250° C.<br>30 min from 250° to 300° C.<br>15 min at 300° C.<br>25 min from 300° to 330° C.<br>20 min at 330° C. | 78.3 | 99.1 |
| 4 | 30 min at 240° C.<br>25 min from 240° to 280° C.<br>10 min at 280° C.<br>25 min from 280° to 350° C.<br>25 min at 350° C. | 76 | 98.5 |
| 5 | 30 min at 240° C.<br>25 min from 240° to 280° C.<br>35 min at 280° C.<br>30 min from 280° to 350° C.<br>10 min at 350° C. | 81.2 | 99.2 |

TABLE 2

| EXAMPLE NUMBER | MELTING POINT (°C.) | ANISOTROPY RANGE (°C.) |
|---|---|---|
| 2 | 355 | from 355° to more than 380° C. |
| 3 | 385 | from 385° to more than 400° C. |
| 4 | 347 | from 347° to more than 370° C. |
| 5 | 351 | from 351° to more than 380° C. |

TABLE 3

| EXAMPLE NUMBER | STRUCTURE OF THE FINAL POLYMERS |
|---|---|
| 2 | $\left[-O-\bigcirc-O-\bigcirc-\underset{\underset{O}{\|}}{C}-\right]_a \left[-O-\bigcirc-\underset{\underset{O}{\|}}{C}-\right]_d$<br>with a = 0.40 and d = 0.60 |
| 3 | $\left[-O-\bigcirc-O-\bigcirc-\underset{\underset{O}{\|}}{C}-\right]_a \left[-O-\bigcirc-\underset{\underset{O}{\|}}{C}-\right]_d$<br>with a = 0.31 and d = 0.69 |
| 4 | $\left[-O-\bigcirc-O-\bigcirc-\underset{\underset{O}{\|}}{C}-\right]_a \left[-O-\bigcirc-\underset{\underset{O}{\|}}{C}-\right]_d$<br>with a = 0.60 and d = 0.40 |
| 5 | $\left[-O-\bigcirc-O-\bigcirc-\underset{\underset{O}{\|}}{C}-\right]_a \left[-\underset{\underset{O}{\|}}{C}-\bigcirc-\underset{\underset{O}{\|}}{C}-\right]_b \left[-O-\bigcirc-O-\right]_c \left[-O-\bigcirc-\underset{\underset{O}{\|}}{C}-\right]_d$<br>with a = 0.48, b = 0.02, c = 0.02 and d = 0.48 |

TABLE 4

| | AMOUNT OF MONOMERS INTRODUCED INTO THE REACTOR | | | | | | | | REACTION TIME (MIN) | |
|---|---|---|---|---|---|---|---|---|---|---|
| | a PPAB | | b T | | c HQdiAc | | d PAB | | UNDER STREAM | UNDER REDUCED |
| EXAMPLE NUMBER | g | mole | g | mole | g | mole | g | mole | OF NITROGEN | PRESSURE |
| 6 | 27.23 | 0.1 | 16.61 | 0.1 | 19.42 | 0.1 | 18.02 | 0.1 | 170 | 65 |
| 7 | 5.18 | 0.019 | 2.99 | 0.018 | 3.5 | 0.018 | 8.11 | 0.045 | 92 | 58 |
| 8 | 9.26 | 0.034 | 1.17 | 0.007 | 1.36 | 0.007 | 9.37 | 0.052 | 67 | 73 |
| 9 | 10.08 | 0.037 | 3.33 | 0.02 | 3.89 | 0.02 | 4.14 | 0.023 | 75 | 75 |
| 10 | 13.61 | 0.05 | 4.15 | 0.025 | 4.85 | 0.025 | / | / | 105 | 80 |

| EXAMPLE NUMBER | REACTION TEMPERATURE (temperature profile) | DEGREE OF CONVERSION (%) | |
|---|---|---|---|
| | | At the end of the step under nitrogen | Final value for the reaction |
| 6 | 50 min at 250° C.<br>90 min from 250° to 300° C.<br>60 min at 300° C.<br>10 min from 300° to 340° C. | 77.2 | 98.7 |

TABLE 4-continued

| | | | |
|---|---|---|---|
| | 25 min at 340° C. | | |
| 7 | 50 min from 230° to 260° C. | 70.1 | 97.3 |
| | 25 min from 260° to 280° C. | | |
| | 45 min at 280° C. | | |
| | 15 min from 280° to 330° C. | | |
| | 15 min at 330° C. | | |
| 8 | 35 min from 230° to 260° C. | 75.2 | 98.2 |
| | 20 min from 260° to 280° C. | | |
| | 50 min at 280° C. | | |
| | 10 min from 280° to 330° C. | | |
| | 25 min at 330° C. | | |
| 9 | 40 min at 240° C. | 73.2 | 97.9 |
| | 25 min from 240° to 280° C. | | |
| | 55 min at 280° C. | | |
| | 15 min from 280° to 330° C. | | |
| | 15 min at 330° C. | | |
| 10 | 40 min at 240° C. | 70.6 | 98.1 |
| | 45 min from 240° to 280° C. | | |
| | 40 min at 280° C. | | |
| | 25 min from 280° to 350° C. | | |
| | 35 min at 350° C. | | |

TABLE 5

| EXAMPLE NUMBER | MELTING POINT (°C.) | ANISOTROPY RANGE (°C.) |
|---|---|---|
| 7 | 315 | from 315° to more than 375° C. |
| 8 | 255 | from 255° to more than 380° C. |
| 9 | 280 | from 280° to more than 360° C. |
| 10 | 336 | from 336° to more than 380° C. |

TABLE 6

| EXAMPLE NUMBER | STRUCTURE OF THE FINAL POLYMERS |
|---|---|
| 6 |  with a = 0.25, b = 0.25, c = 0.25 and d = 0.25 |
| 7 |  with a = 0.19, b = 0.18, c = 0.18 and d = 0.45 |
| 8 |  with a = 0.34, b = 0.07, c = 0.07 and d = 0.52 |
| 9 |  with a = 0.37, b = 0.20, c = 0.20 and d = 0.23 |
| 10 |  with a = 0.50, b = 0.25 and c = 0.25 |

TABLE 7

| | AMOUNT OF MONOMERS INTRODUCED INTO THE REACTOR | | | | | | | | | |
|---|---|---|---|---|---|---|---|---|---|---|
| | a | b | | | c | | | d | | |
| | PPAB | DIACID | | | DIPHENOL DIACETATE | | | PAB | | PAMB |
| EXAMPLE NUMBER | g mole | NATURE | g | mole | NATURE | g | mole | g | mole | g mole |
| 11 | 5.99 0.022 | T | 2.33 | 0.014 | MeHQ | 2.92 | 0.014 | 9.01 | 0.05 | / / |

TABLE 7-continued

| | | | | | | DIAo | | | | | | |
|---|---|---|---|---|---|---|---|---|---|---|---|---|
| 12 | 8.99 | 0.033 | I | 2.83 | 0.017 | 4,4'DHBP DIAc | 4.6 | 0.017 | 5.95 | 0.033 | / | / |
| 13 | 7.9 | 0.029 | T | 2.33 | 0.014 | HQ DIAc | 2.72 | 0.014 | 5.23 | 0.029 | 2.96 | 0.014 |
| 14 | 5.72 | 0.021 | 4,4' DCPDE | 3.62 | 0.014 | 4,4'DHBP DIAc | 3.79 | 0.014 | 9.19 | 0.051 | / | / |
| 15 | 13.62 | 0.05 | T | 2 | 0.012 | 4,4'DHDPE DIAc | 3.44 | 0.012 | 4.69 | 0.026 | / | / |

| EXAMPLE NUMBER | REACTION TIME (MIN) | | REACTION TEMPERATURE (temperature profile) | DEGREE OF CONVERSION (%) | |
|---|---|---|---|---|---|
| | UNDER STREAM OF NITROGEN | UNDER REDUCED PRESSURE | | At the end of the step under nitrogen | Final value for the reaction |
| 11 | 55 | 100 | 20 min at 240° C. 15 min from 240° to 280° C. 55 min at 280° C. 30 min from 280° to 340° C. 35 min at 340° C. | 75.2 | 97.6 |
| 12 | 60 | 110 | 30 min at 240° C. 15 min from 240° to 280° C. 75 min at 280° C. 30 min from 280° to 340° C. 20 min at 340° C. | 71.9 | 98.8 |
| 13 | 50 | 105 | 20 min at 240° C. 10 min from 240° to 280° C. 70 min at 280° C. 30 min from 280° to 340° C. 25 min at 340° C. | 78.6 | 98.3 |
| 14 | 40 | 80 | 20 min at 240° C. 10 min from 240° to 280° C. 45 min at 280° C. 15 min from 280° to 340° C. 30 min at 340° C. | 72.7 | 99.1 |
| 15 | 35 | 90 | 20 min at 240° C. 10 min from 240° to 280° C. 45 min at 280° C. 35 min from 280° to 340° C. 15 min at 340° C. | 71.8 | 98.7 |

TABLE 8

| EXAMPLE NUMBER | MELTING POINT (°C.) | ANISOTROPY RANGE (°C.) |
|---|---|---|
| 11 | 275 | from 275° to more than 370° C. |
| 12 | 252 | from 252° to more than 370° C. |
| 13 | 230 | from 230° to more than 370° C. |
| 14 | 281 | from 281° to more than 370° C. |
| 15 | 310 | from 310° to 350° C. |

TABLE 9

| EXAMPLE NUMBER | STRUCTURE OF THE FINAL POLYMERS |
|---|---|

11

$$\left[O-\phi-O-\phi-C(=O)\right]_a \left[C(=O)-\phi-C(=O)\right]_b \left[O-\phi(CH_3)-O\right]_c \left[O-\phi-C(=O)\right]_d$$

with a = 0.22, b = 0.14, c = 0.14 and d = 0.50

12

$$\left[O-\phi-O-\phi-C(=O)\right]_a \left[C(=O)-\phi-C(=O)\right]_b \left[O-\phi-\phi-O\right]_c \left[O-\phi-C(=O)\right]_d$$

with a = 0.33, b = 0.17, c = 0.17 and d = 0.33

13

$$\left[O-\phi-O-\phi-C(=O)\right]_a \left[C(=O)-\phi-C(=O)\right]_b \left[O-\phi-O\right]_c \left[O-\phi-C(=O)\right]_d \left[O-\phi(OCH_3)-C(=O)\right]_{d'}$$

with a = 0.29, b = 0.14, c = 0.14, d = 0.29 and d' = 0.14

TABLE 9-continued

| EXAMPLE NUMBER | STRUCTURE OF THE FINAL POLYMERS |
|---|---|
| 14 | $\left[O-\bigcirc-O-\bigcirc-\underset{\underset{O}{\|}}{C}\right]_a \left[\underset{\underset{O}{\|}}{C}-\bigcirc-O-\bigcirc-\underset{\underset{O}{\|}}{C}\right]_b \left[O-\bigcirc-\bigcirc-O\right]_c \left[O-\bigcirc-\underset{\underset{O}{\|}}{C}\right]_d$ with a = 0.21, b = 0.14, c = 0.14 and d = 0.51 |
| 15 | $\left[O-\bigcirc-O-\bigcirc-\underset{\underset{O}{\|}}{C}\right]_a \left[\underset{\underset{O}{\|}}{C}-\bigcirc-\underset{\underset{O}{\|}}{C}\right]_b \left[O-\bigcirc-O-\bigcirc-O\right]_c \left[O-\bigcirc-\underset{\underset{O}{\|}}{C}\right]_d$ with a = 0.50, b = 0.12, c = 0.12 and d = 0.26 |

TABLE 10

| EXAMPLE No. 1 | | EXAMPLE No. 5 | | EXAMPLE No. 6 | |
|---|---|---|---|---|---|
| TEMPERATURE °C. | G' $10^{-9}$ Pa | TEMPERATURE °C. | G' $10^{-9}$ Pa | TEMPERATURE °C. | G' $10^{-9}$ Pa |
| −141 | 1.977 | −141 | 1.729 | −141 | 2.187 |
| −122 | 1.927 | −125 | 1.671 | −122 | 2.131 |
| −111 | 1.884 | −109 | 1.588 | −107 | 2.056 |
| −94 | 1.805 | −93 | 1.538 | −91 | 1.963 |
| −73 | 1.667 | −72 | 1.42 | −71 | 1.804 |
| −52 | 1.5 | −51 | 1.272 | −50 | 1.609 |
| −30 | 1.326 | −31 | 1.045 | −30 | 1.407 |
| −10 | 1.192 | −10 | 0.94 | −9 | 1.241 |
| 11 | 1.101 | 11 | 0.879 | 12 | 1.137 |
| 32 | 1.041 | 31 | 0.832 | 32 | 1.074 |
| 53 | 0.976 | 52 | 0.79 | 52 | 1.003 |
| 75 | 0.886 | 73 | 0.758 | 74 | 0.9 |
| 95 | 0.821 | 94 | 0.727 | 95 | 0.826 |
| 116 | 0.732 | 114 | 0.667 | 114 | 0.719 |
| 136 | 0.389 | 134 | 0.333 | 135 | 0.456 |
| 148 | 0.16 | 145 | 0.166 | 146 | 0.351 |
| 158 | 0.096 | 154 | 0.113 | 157 | 0.302 |
| 168 | 0.076 | 170 | 0.078 | 166 | 0.276 |
| 183 | 0.062 | | | 182 | 0.244 |
| 198 | 0.05 | | | 196 | 0.216 |
| 208 | 0.042 | | | 206 | 0.198 |
| 218 | 0.035 | | | 217 | 0.178 |
| 223 | 0.029 | | | 227 | 0.158 |
| | | | | 231 | 0.146 |

TABLE 11

| | AMOUNT OF MONOMERS INTRODUCED INTO THE REACTOR | | | | | | | | | | |
|---|---|---|---|---|---|---|---|---|---|---|---|
| | a | | b | | | | c | | | | d |
| EXAMPLE | PAPB | | T | | I | | HQDiAC | | 4,4'DHBP DiAC | | PAB |
| NUMBER | g | mole | g | mole | g | mole | g | mole | g | mole | g | mole |
| 16 | 5.45 | 0.02 | 3.32 | 0.02 | / | / | 3.88 | 0.02 | / | / | 7.21 | 0.04 |
| 17 | 5.45 | 0.02 | 3.32 | 0.02 | / | / | 2.91 | 0.015 | 1.35 | 0.005 | 7.21 | 0.04 |
| 18 | 5.45 | 0.02 | 3.32 | 0.02 | / | / | / | / | 5.41 | 0.02 | 7.21 | 0.04 |
| 19 | 2.72 | 0.01 | 3.32 | 0.02 | / | / | 1.94 | 0.01 | 2.7 | 0.01 | 9.01 | 0.05 |
| 20 | 1.36 | 0.005 | 2.49 | 0.015 | 0.83 | 0.005 | 1.94 | 0.01 | 2.7 | 0.01 | 9.91 | 0.055 |

| | REACTION TIME (MIN) | | | DEGREE OF CONVERSION (%) | |
|---|---|---|---|---|---|
| EXAMPLE NUMBER | UNDER STREAM OF NITROGEN | UNDER REDUCED PRESSURE | REACTION TEMPERATURE (temperature profile) | At the end of the step under nitrogen | Final value of the reaction |
| 16 | 115 | 65 | 45 min at 240° C. 30 min from 240° to 300° C. 25 min at 300° C. 40 min from 300° to 345° C. 30 min at 345° C. | 79.6 | 98.2 |
| 17 | 105 | 75 | 40 min at 240° C. 50 min from 240° to 300° C. 40 min at 300° C. 40 min from 300° to 345° C. 10 min at 345° C. | 73.2 | 99.3 |
| 18 | 120 | 75 | 50 min at 240° C. 30 min from 240° to 300° C. 70 min at 300° C. 35 min from 300° to 340° C. 10 min at 340° C. | 75.1 | 98.7 |

TABLE 11-continued

| 19 | 105 | 70 | 35 min at 240° C.<br>65 min from 240° to 300° C.<br>40 min at 300° C.<br>15 min from 300° to 340° C.<br>20 min at 340° C. | 74 | 98.5 |
| 20 | 85 | 55 | 20 min at 240° C.<br>30 min from 240° to 300° C.<br>10 min at 300° C.<br>30 min from 300° to 350° C.<br>50 min at 350° C. | 83.3 | 99.4 |

TABLE 12

| EXAMPLE NUMBER | MELTING TEMPERATURE (°C.) | ANISOTROPY RANGE (°C.) |
|---|---|---|
| 16 | 340 | from 340° to more than 380° C. |
| 17 | 316 | from 316° to more than 370° C. |
| 18 | 312 | from 312° to more than 370° C. |
| 19 | 325 | from 325° to more than 370° C. |
| 20 | 334 | from 334° to more than 380° C. |

TABLE 13

STRUCTURE OF THE FINAL POLYMERS

| EXAMPLE NUMBER | STRUCTURE |
|---|---|
| 16 | with a = 0.20, b = 0.20, c = 0.20 and d = 0.40 |
| 17 | with a = 0.20, b = 0.20, c = 0.15, c' = 0.05 and d = 0.40 |
| 18 | with a = 0.20, b = 0.20, c = 0.20 and d = 0.40 |
| 19 | with a = 0.10, b = 0.20, c = 0.10, c' = 0.10 and d = 0.50 |
| 20 | with a = 0.05, b = 0.15, b' = 0.05, c = 0.10, c' = 0.10 and d = 0.55 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A thermotropic aromatic copolyester comprising the following recurring structural units:

(I)

(II)

(III)

with or without, (IV)

in which recurring unit $Ar_1$ is selected from the group consisting of an aromatic radical, cycloaliphatic radical and aromatic/cycloaliphatic radical, and $Ar_2$ is an aromatic radical, each aromatic or aliphatic radical of recurring units (I) to (IV) either being substituted or unsubstituted, and with the proviso that the amount of the recurring units (I) relative to the sum of all of the recurring units ranges from 2.5% to 60 mol %, the amount of the recurring units (II) relative to the sum of all of the recurring units ranges from 2.5% to 45 mol %, the amount of the recurring units (III) relative to the sum of all of the recurring units ranges from 2.5% to 45 mol %, the amount of the recurring units (IV) relative to the sum of all of the recurring units ranges from 0% to 90 mol %, and the mole ratio of the recurring units (II) to the recurring units (III) ranges from 0.95 to 1.05.

2. The thermotropic aromatic copolyester as defined by claim 1, comprising not more than 60 mol % of non-linear recurring units.

3. The thermotropic aromatic copolyester as defined by claim 1, said recurring units (I) being derived from (substituted) p-(p-hydroxyphenoxy)benzoic acid, from one or more (substituted) derivative thereof or from any combination thereof.

4. The thermotropic aromatic copolyester as defined by claim 1, said recurring units (II) being derived from at least one (substituted) aromatic diacid, cycloaliphatic diacid, aromatic/cycloaliphatic diacid from one or more (substituted) derivative thereof or from any combination thereof.

5. The thermotropic aromatic copolyester as defined by claim 1, said recurring units (III) being derived from at least one (substituted) diphenol, from one or more (substituted) derivative thereof or from any combination thereof.

6. The thermotropic aromatic copolyester as defined by claim 1, comprising recurring units (IV) derived from (substituted) p-hydroxybenzoic acid, from one or more (substituted) derivative thereof or from any combination thereof.

7. The thermotropic aromatic copolyester as defined by claim 1, having a number average molecular weight ranging from 3,000 to 50,000.

8. A process for the preparation of the thermotropic aromatic copolyester as defined by claim 1, comprising condensing an admixture of a member selected from the group consisting of p-(p-hydroxyphenoxy)benzoic acid, one or more derivative thereof and any combination thereof, at least one aromatic diacid, cycloaliphatic diacid, aromatic/cycloaliphatic diacid, one or more derivative thereof and any combination thereof, and, with or without p-hydroxybenzoic acid, one or more derivative thereof or any combination thereof, wherein said p-hydroxybenzoic acid or derivative thereof is substituted or unsubstituted, at a temperature ranging from 100° to 400° C.

9. The process as defined by claim 8, comprising directly polycondensing p-(p-hydroxyphenoxy)benzoic acid with one or more aromatic diacids of the formula:

one or more diphenols of the formula $HO-Ar_2-OH$; and (substituted) p-hydroxybenzoic acid, one or more (substituted) derivative thereof or any combination thereof.

10. The process as defined by claim 8, comprising polytransesterifying one or more esters of p-(p-hydroxyphenoxy)benzoic acid of the formula:

one or more aromatic diesters of the formula:

one or more diphenols of the formula:

and one or more (substituted) esters of p-hydroxybenzoic acid, (substituted derivative of the formula:

or any combination thereof.

11. The process as defined by claim 8, comprising polytransesterifying or acidolyzing one more phenol esters of p-(p-hydroxyphenoxy)benzoic acid of the formula:

one or more aromatic diacids of the formula:

HOOC—Ar$_1$—COOH.

one or more diphenol esters of the formula:
RCOO—Ar$_2$OCOR, and one more (substituted) phenol esters of p-hydroxybenzoic acid, (substituted derivative of the formula:

or any combination thereof.

12. The process as defined by claim 8, comprising condensing in the presence of a catalytically effective amount of at least one catalyst.

* * * * *